(12) United States Patent
McSweyn

(10) Patent No.: US 7,870,666 B2
(45) Date of Patent: Jan. 18, 2011

(54) WIRE ROUTING TOOL AND METHOD

(75) Inventor: Christopher Michael McSweyn, Venice, CA (US)

(73) Assignee: Scosche Industries, Inc., Oxnard, CA (US)

( * ) Notice: Subject to any disclaimer, the term of this patent is extended or adjusted under 35 U.S.C. 154(b) by 723 days.

(21) Appl. No.: 11/764,102

(22) Filed: Jun. 15, 2007

(65) Prior Publication Data

US 2008/0309104 A1    Dec. 18, 2008

(51) Int. Cl.
*H05K 13/00* (2006.01)

(52) U.S. Cl. .............................. 29/854; 29/857; 29/868; 29/749; 29/750; 29/758; 362/119

(58) Field of Classification Search .................... 29/854, 29/857, 868, 749, 750, 758; 362/119
See application file for complete search history.

(56) References Cited

U.S. PATENT DOCUMENTS

| 382,257 | A | | 5/1888 | Geyser |
| 423,134 | A | | 3/1890 | Cope |
| 2,288,093 | A | | 6/1942 | Kaffenberger et al. |
| 4,083,533 | A | | 4/1978 | Schwabe |
| 4,586,079 | A | | 4/1986 | Cooper, Jr. et al. |
| 4,684,211 | A | * | 8/1987 | Weber et al. ................. 385/136 |
| 5,029,815 | A | | 7/1991 | Kumpf |
| 5,374,034 | A | | 12/1994 | Flores, Sr. et al. |
| 5,762,321 | A | | 6/1998 | Petersent et al. |
| 2006/0215395 | A1 | * | 9/2006 | Yen ............................ 362/119 |

FOREIGN PATENT DOCUMENTS

| EP | 0 957 549 | | 11/1999 |
| WO | WO 97/42531 | | 4/1997 |
| WO | WO 02/17455 | | 2/2002 |
| WO | WO 0217455 A1 | * | 2/2002 |
| WO | WO 03/043154 | | 5/2003 |

* cited by examiner

*Primary Examiner*—Derris H Banks
*Assistant Examiner*—Azm Parvez
(74) *Attorney, Agent, or Firm*—Arent Fox LLP

(57) ABSTRACT

A wire routing tool includes a guiding tip, a malleable shaft having a first end operatively connected to said guiding tip and a second end, and a guiding head having a first end operatively connected to said second end of said malleable shaft and a second end including a connector.

16 Claims, 3 Drawing Sheets

WIRE ROUTING TOOL AND METHOD

BACKGROUND

1. Field

The present disclosure relates generally to hand tools, and more particularly, to the operation and use of a hand tool configured to route wire through substantially inaccessible spaces such as behind dashboards or under the lining of a vehicle's interior.

2. Background

Traditionally, car audio installation technicians and enthusiasts struggle with routing the necessary cables to their appropriate destination when installing the many aftermarket components manufactured in the industry. This struggle may arise due to the relatively tight space constraints that one is to work within while installing or troubleshooting these components. At present, one of ordinary skill in the art must be immensely creative in fashioning a tool that would allow them to route a wire through a dashboard's many crevices, harnesses, and other obstacles. As such, there is a need in the art for a tool that would easily allow one to attach the needed cable at one end of a tool, use the tool to route over and under the various obstacles, and pull through the cable in order to readily connect it to the appropriate component.

SUMMARY

One aspect of a wire routing tool is disclosed. A wire routing tool includes a guiding tip, a malleable shaft having a first end operatively connected to said guiding tip and a second end, and a guiding head having a first end operatively connected to said second end of said malleable shaft and a second end including a connector.

Another aspect of a wire routing tool is disclosed. A wire routing tool includes a malleable shaft having first and second opposite said first end, means, located at said first end of said malleable shaft, for guiding said malleable shaft, and means, located at said second end of said malleable shaft, for supporting a connector.

One aspect of a method for routing wire through a substantially inaccessible space with a wire routing tool is also disclosed. The method includes acquiring a wire routing tool having a guiding tip, a malleable shaft having a first end operatively connected to said guiding tip and a second end, and a guiding head having a first end operatively connected to said second end of said malleable shaft and a second end including a connector, connecting a wire to said connector, routing said wire through said substantially inaccessible space by guiding said guiding tip through a first opening in said substantially inaccessible space, and pulling said guiding tip from a second opening in said substantially inaccessible space.

These, as well as other objects, features and benefits will now become clear from a review of the following detailed description of illustrative embodiments and the accompanying drawings.

DESCRIPTION OF DRAWINGS

Aspects of the present invention are illustrated by way of example, and not by way of limitation, in the accompanying drawings wherein.

DETAILED DESCRIPTION

The detailed description set forth below in connection with the appended drawings are intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details.

Figure 1:
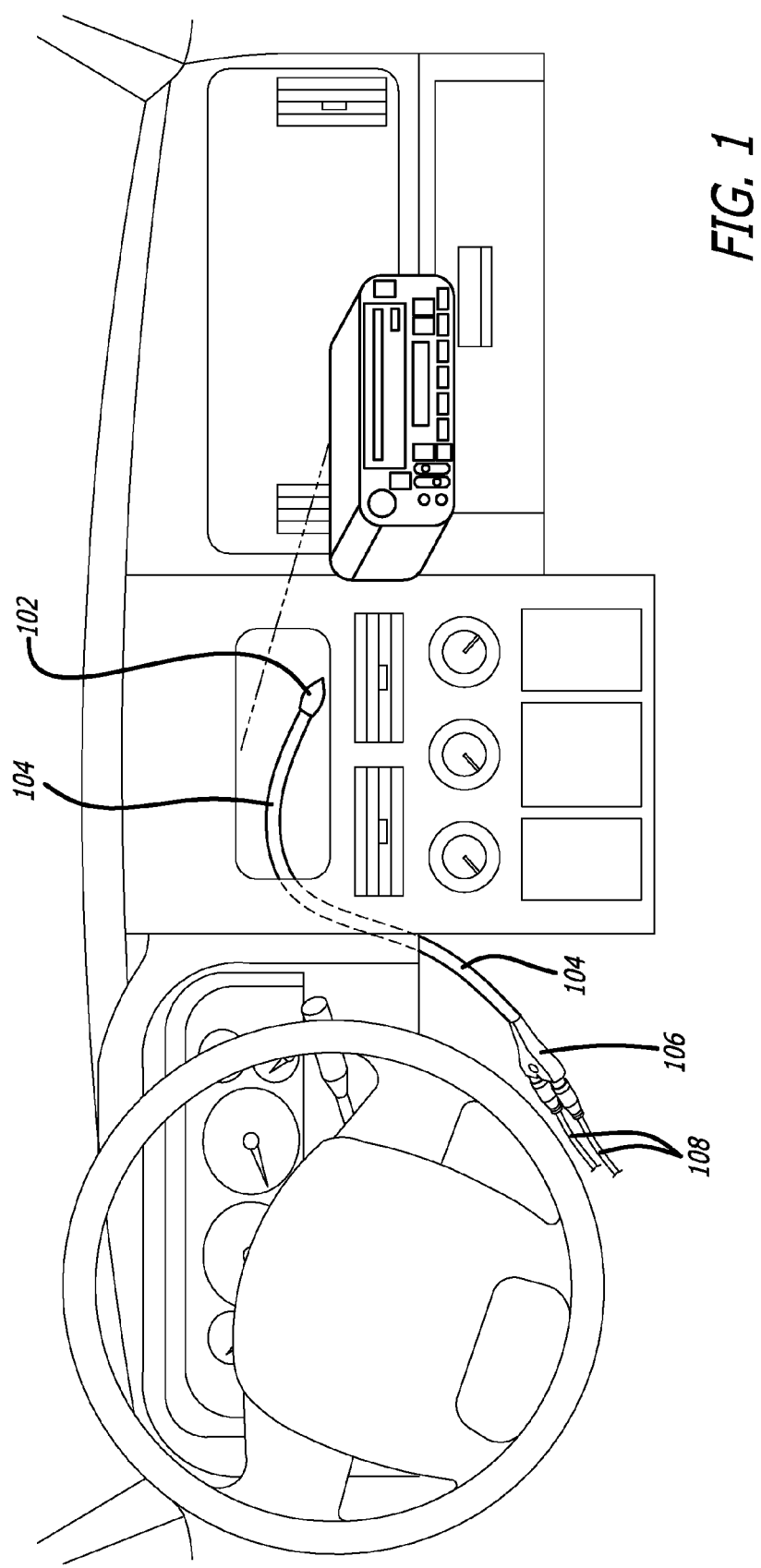
FIG. 1 illustrates the conventional use of a wire routing tool when used to route cables through a vehicle's dashboard.

FIG. 1 illustrates the use of a wire routing tool when used to route cables through a vehicle's dashboard. The wire routing tool 200 (see FIG. 2) may be used to guide wire 108 as illustrated. The wire 108 is connected to the guiding head 106 of the wire routing tool 200. Due to the malleable and flexible nature of the shaft 104, a user is able to manipulate the wire routing tool 200 to conform with endless variations of foreseeable obstacles. Though the shaft 104 is capable of being flexed and manipulated into a temporarily rigid structure before inserting the guiding point 102, upon insertion into the substantially inaccessible cavity, the shaft 104 remains flexible enough so as to allow a user to pull the shaft 104 through with relative ease. Once the wire routing tool 200 has been substantially pulled through the largely inaccessible cavity, the guiding head 106 will have cleared the opening enough to allow a user to manually disconnect the wire 108. Upon disconnecting the wire 108 from the guiding head 106, a user is able to connect the now pre-routed wire 108 onto the respective component.

Figure 2:
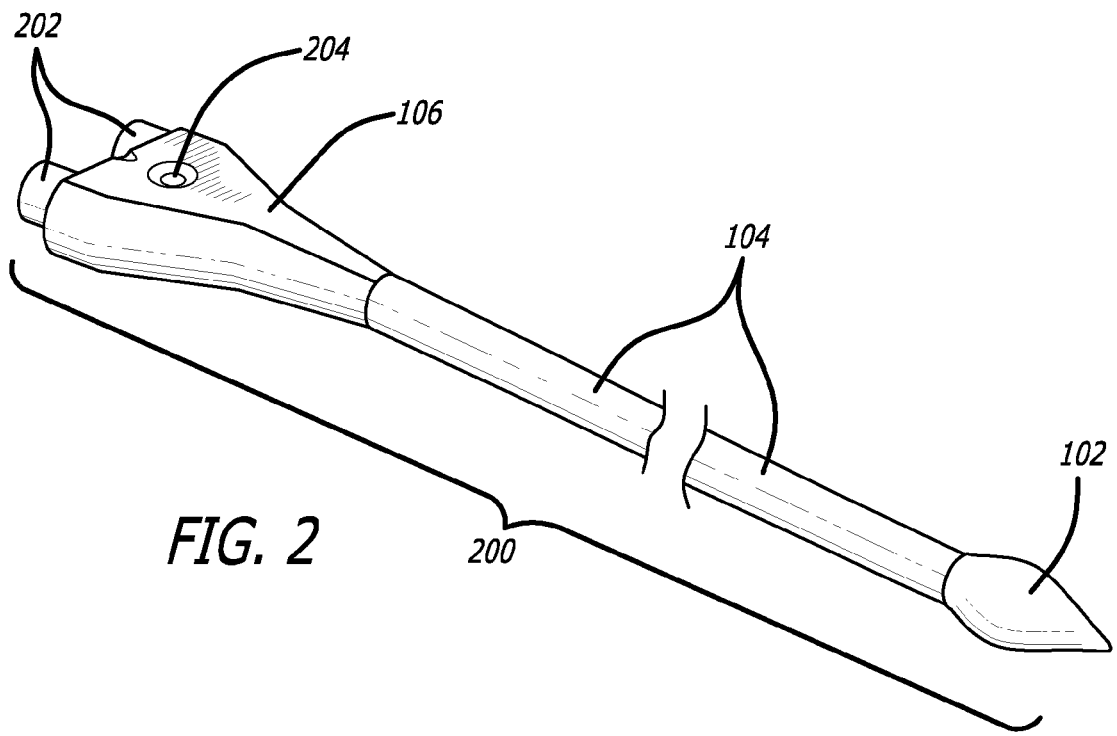
FIG. 2 is a perspective view of a wire routing tool.

FIG. 2 is a perspective view of a wire routing tool. The wire routing tool 200 may be comprised of three joined portions: the guiding point 102, the shaft 104, and the guiding head 106. The guiding head 106 bears structural features that allow for the temporary connection of the wire 108 to be routed. For example, the guiding head 106 may have one or more RCA connectors 202 or jacks for plugging in a cable with RCA-type plugs. Thus, a user wishing to route a cable through a substantially inaccessible space will plug the wire 108 they choose to route into the RCA connectors 202 and use the wire routing tool 200 to guide the cable through the space until the guiding point 102 or the shaft 104 are accessible enough to be pulled through manually.

In addition, the guiding head 106 may also have an aperture 204 that allows a user to insert a small gauge wire that may need to be routed. One of ordinary skill in the art may appreciate that the size of the aperture 204 is only limited by the size of the guiding head 106. The larger the aperture 204, the larger gauge wire that one would be able to insert into the aperture 204. The term aperture may be construed as hole, opening, orifice, or any other means so as to allow small gauge wire to pass through the aperture. Generally, the guiding head 106 may readily incorporate an aperture 204 that will accept wire with a gauge of greater than 8 AWG (American Wire Gauge) without substantially reducing the effectiveness that the guiding head 106 may have in navigating through obstacles.

Figure 3:
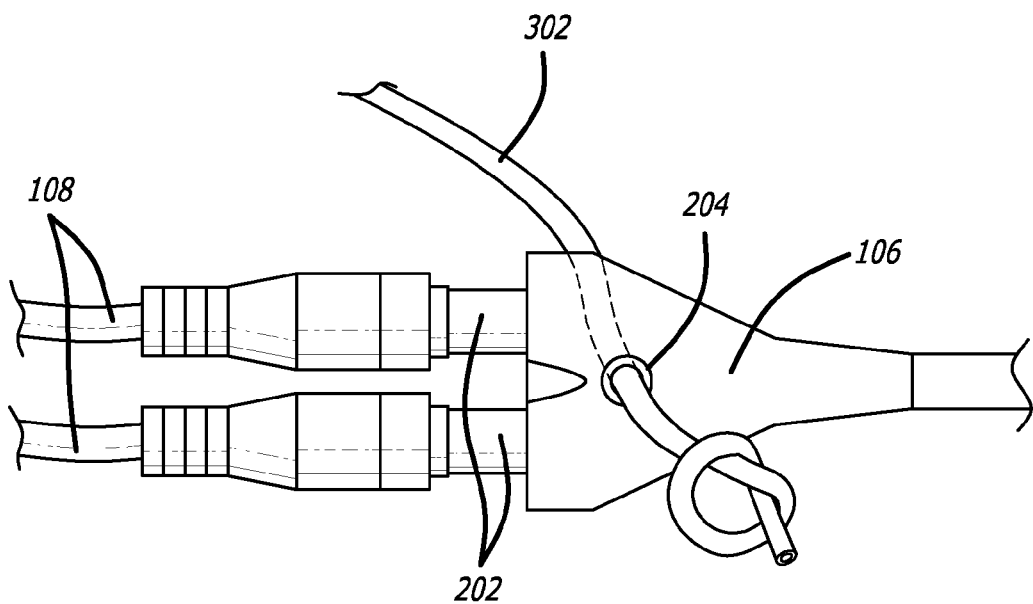
FIG. 3 is a top elevational view of the guiding head portion of the wire routing tool.

FIG. 3 is a top elevational view of the guiding head portion of the wire routing tool. The guiding head 106, as illustrated, may have the ability to route two different type of wire: an RCA-type wire 108, typically utilized to connect audio and video components, and a small gauge wire 302. One attempting to route the RCA-type wire 108 may simply connect the RCA male ends into the one or more RCA connectors 202 and then use the wire routing tool 200 with connected wire 108 to route through the substantially inaccessible space. Although not depicted, one of ordinary skill in the art may reinforce the wire 108 and RCA connector 202 connection by using tape. This may minimize the ability of the wire 108 becoming inadvertently disconnected from the RCA connector 202 while attempting to route.

Likewise, one may want to route small gauge wire that does not have RCA-type connector ends, in which case the user may insert the small gauge wire 302 through the aperture 204 on the guiding head 106. The user may then tie a knot at the end of the wire 302 so as to prevent the wire from slipping out of the aperture 204. Although tying a knot at the end of the wire 302 may prevent it from unintentionally slipping out of the aperture 204, one of ordinary skill in the art may just as easily use tape or other similar adhesive in lieu of tying a knot in order to accomplish the same thing.

Once the user has successfully routed the entire wire routing tool 200 through the substantially inaccessible space, the user may manually disconnect the wire 108 from the connector 202 and connect the newly routed wire 108 to the audio or video device to be installed. Similarly, the user may manually untie or cut the knotted portion of the small gauge wire 302, remove from the aperture 204 and connect the newly routed small gauge wire 302 to the respective device.

Figure 4:
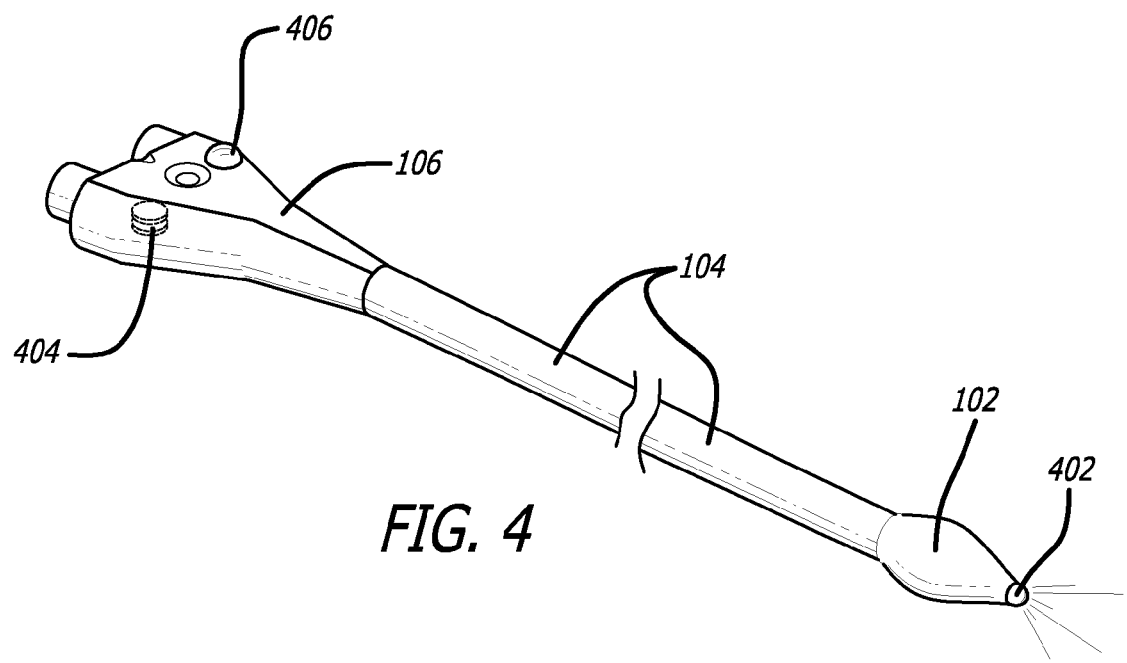
FIG. 4 is a perspective view of a wire routing tool with illumination.

FIG. 4 is a perspective view of a wire routing tool with illumination. In this representative embodiment an LED (light emitting diode) 402 may be incorporated onto he guiding head 102 for lighting the routing path. Although an on/off switch may be placed anywhere on the wire routing tool 200, for ease of placement and in order to maintain its relatively smooth contours, one of ordinary skill in the art may integrate the illuminating circuitry into the wire routing tool 200 by placing the on/off switch 406 on the guiding head 106. The illuminating circuitry may obtain its power from a battery 404 that may be installed in the guiding head 106. In addition, the illuminating circuitry may extend about the length of the shaft 104, through the guiding tip 102, and arrive at the LED 402 so as to allow the on/off switch 406 to control the power to the LED 402. Although this embodiment illustrates the use of an LED as the illuminating source, one of ordinary skill in the art may just as easily replace it with an incandescent lamp, a fluorescent light, a high-intensity discharge lamp, or any other similar illumination device.

Figure 5:
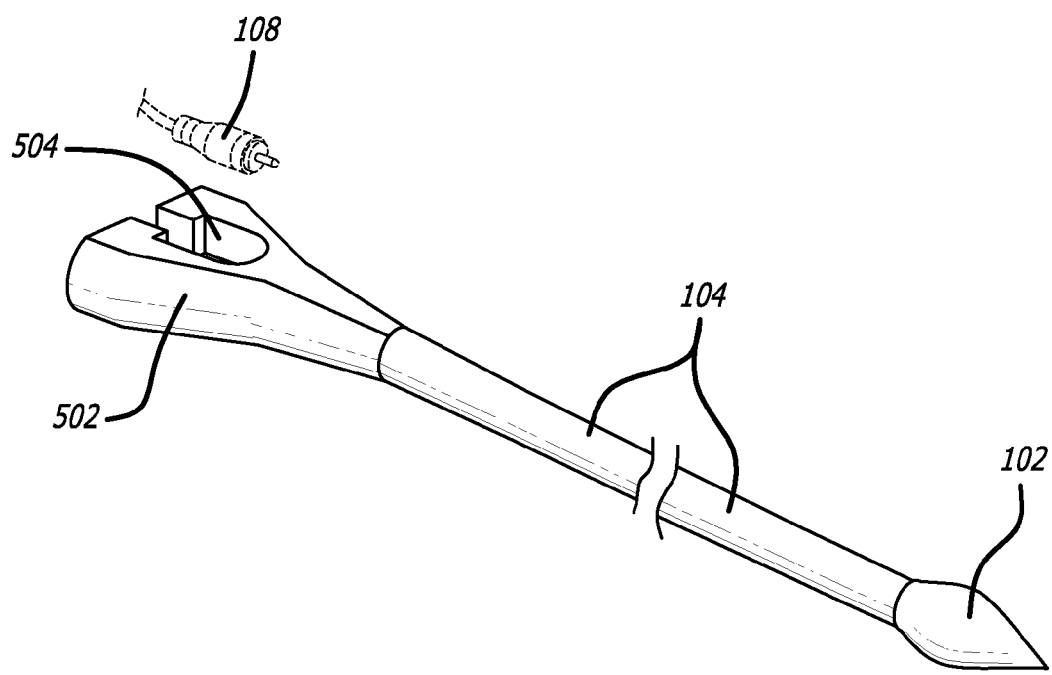
FIG. 5 is a perspective view of a wire routing tool wherein the guiding head portion has a hollow.

FIG. 5 is a perspective view of a wire routing tool wherein the guiding head portion has a void for receiving a cable end connector. As an alternative embodiment to the above, the guiding head 106 may be replaced with a guiding head 502. The guiding head 502 has a void 504 that substantially mimics the outline of an RCA connector end. The guiding head 502 allows a user to insert a wire 108 having an RCA connector end into the void 504 without having to user the previously mentioned connectors 202. Subsequent to inserting the wire 108 jack into the void 504, a user is able to route through the substantially inaccessible space as previously explained.

While the specification describes particular embodiments of the present invention, those of ordinary skill can devise variations of the present invention without departing from the inventive concept. Also, the previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language of the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A wire routing tool, comprising:
   a guiding tip;
   a malleable shaft having a first end operatively connected to said guiding tip and a second end; and
   a guiding head having a first end operatively connected to said second end of said malleable shaft and a second end including an RCA jack plug-in connector for connecting a wire having an RCA plug to be routed.

2. The wire routing tool of claim 1 wherein said guiding head further comprises an aperture for receiving a second wire.

3. The wire routing tool of claim 2 wherein said second wire has a gauge of greater than 8 AWG.

4. The wire routing tool of claim 3 wherein said malleable shaft is capable of being flexed into a temporarily rigid structure.

5. The wire routing tool of claim 4 wherein said guiding tip further comprises a conical shape at one end so as to facilitate routing through obstacles in a substantially inaccessible space.

6. The wire routing tool of claim 5 wherein said guiding head comprises a substantially triangular body, wherein said substantially triangular body tapers towards said malleable shaft.

7. The wire routing tool of claim 6 wherein said guiding tip further comprises a light at the apex of said conical shape.

8. A wire routing tool, comprising:
   a guiding tip;
   a malleable shaft having a first end operatively connected to said guiding tip and a second end; and
   a guiding head having a first end operatively connected to said second end of said malleable shaft and a second end for connecting a wire to be routed,
   wherein said guiding head further comprises a void substantially conforming to at least a portion of a cable end having an RCA plug connector for receiving and securing the RCA plug connector cable end.

9. A wire routing tool, comprising:
   a malleable shaft having a first end and a second end opposite said first end;
   means, located at said first end of said malleable shaft, for guiding said malleable shaft; and
   means, located at said second end of said malleable shaft, for plugging a wire having an RCA plug to be routed into the second end.

10. The tool of claim 9 wherein said malleable shaft comprises means for providing a temporarily rigid structure.

11. The tool of claim 10 wherein said second end further comprises means for passing a second wire through said second end.

12. The tool of claim 11 wherein said second wire comprises a gauge of greater than 8 AWG.

13. The tool of claim 9 wherein said guiding means further comprises means for illuminating a guiding path.

14. A method for routing wire through a substantially inaccessible space with a wire routing tool, the wire routing tool having a guiding tip, a malleable shaft having a first end operatively connected to said guiding tip and a second end, and a guiding head having a first end operatively connected to said second end of said malleable shaft and a second end including an RCA jack connector, the method comprising:

plugging a wire having an RCA plug into said RCA jack connector;

routing said wire through said substantially inaccessible space by guiding said guiding tip through a first opening in said substantially inaccessible space; and pulling said guiding tip from a second opening in said substantially inaccessible space.

15. The method of claim 14, further comprising passing a second wire through an aperture in said second end of the wire routing tool, 16. The method of claim 15 wherein said second wire comprises a gauge of greater than 8 AWG.

* * * * *